(12) United States Patent
Chia et al.

(10) Patent No.: US 10,869,529 B2
(45) Date of Patent: *Dec. 22, 2020

(54) HAND HELD APPLIANCE

(71) Applicant: Dyson Technology Limited, Wiltshire (GB)

(72) Inventors: Weiyi Chia, Singapore (SG); Eric Purnama Utama Ng, Singapore (SG)

(73) Assignee: Dyson Technology Limited, Wiltshire (GB)

( * ) Notice: Subject to any disclaimer, the term of this patent is extended or adjusted under 35 U.S.C. 154(b) by 198 days.

This patent is subject to a terminal disclaimer.

(21) Appl. No.: 15/914,413

(22) Filed: Mar. 7, 2018

(65) Prior Publication Data

US 2018/0255896 A1    Sep. 13, 2018

(30) Foreign Application Priority Data

Mar. 9, 2017   (GB) .................................. 1703764.9

(51) Int. Cl.
*A45D 2/00*     (2006.01)
*A45D 20/12*    (2006.01)
*B01D 46/24*    (2006.01)

(52) U.S. Cl.
CPC .............. *A45D 2/00* (2013.01); *A45D 20/12* (2013.01); *B01D 46/24* (2013.01)

(58) Field of Classification Search
CPC ........... A45D 2/00; A45D 20/12; B01D 46/24
USPC ...................................... 34/95–100
See application file for complete search history.

(56) References Cited

U.S. PATENT DOCUMENTS

| 3,265,075 A | 8/1966 | Edman et al. |
| 3,953,710 A | 4/1976 | Dyer |
| 4,254,324 A | 3/1981 | Vrtaric |
| 5,325,809 A | 7/1994 | Mulle, Jr. |

(Continued)

FOREIGN PATENT DOCUMENTS

| AU | 2017208192 A1 | 8/2017 |
| CN | 201341553 Y | 11/2009 |

(Continued)

OTHER PUBLICATIONS

International Search Report and Written Opinion dated May 29, 2018, directed to International Application No. PCT/GB2018/050451; 12 pages.

(Continued)

*Primary Examiner* — Stephen M Gravini
(74) *Attorney, Agent, or Firm* — Morrison & Foerster LLP

(57) ABSTRACT

A haircare appliance includes a handle having a fluid inlet at one end and a power cable, wherein the fluid inlet is formed at least partially around the power cable and the fluid inlet comprises a filter grille, wherein the filter grille is formed from two parts. The filter grille may extend at least partially along the length of the handle. The handle and the filter grille may be cylindrical. The two parts of the filter grille may join together to produce an assembled grille. The assembled grille may be removable from the handle of the appliance. The assembled grille may be retained around the power cable when the assembled grilled is removed from the handle of the appliance. The two parts of the filter grille may be united via a lap joint.

26 Claims, 7 Drawing Sheets

(56) References Cited

U.S. PATENT DOCUMENTS

| | | | | |
|---|---|---|---|---|
| 5,490,336 | A | * | 2/1996 | Smick .................... A45D 20/12 34/82 |
| 6,798,982 | B2 | * | 9/2004 | Ryu ....................... A45D 20/10 34/97 |
| 7,038,171 | B2 | * | 5/2006 | Osada .................... A61L 9/16 219/385 |
| 8,028,437 | B2 | * | 10/2011 | Brown-Carter ........ A45D 20/12 132/119.1 |
| 8,256,132 | B2 | * | 9/2012 | Gaillard ................. A45D 20/12 132/221 |
| 8,857,447 | B2 | | 10/2014 | Heller |
| 9,282,799 | B2 | * | 3/2016 | Courtney ............... A45D 20/12 |
| 9,526,310 | B2 | * | 12/2016 | Courtney ............... A45D 20/12 |
| 10,010,150 | B2 | * | 7/2018 | Courtney ............... A45D 20/00 |
| D830,630 | S | * | 10/2018 | Chia .............................. D28/18 |
| D848,675 | S | * | 5/2019 | Chia .............................. D28/18 |
| 10,278,471 | B2 | * | 5/2019 | Shelton .................. A45D 20/12 |
| D854,745 | S | * | 7/2019 | Chia .............................. D28/18 |
| D856,579 | S | * | 8/2019 | Chia .............................. D28/18 |
| D856,580 | S | * | 8/2019 | Chia .............................. D28/18 |
| 10,575,617 | B2 | * | 3/2020 | Courtney ............. A45D 20/122 |
| 2009/0188126 | A1 | | 7/2009 | Gaillard et al. |
| 2014/0208605 | A1 | | 7/2014 | Yoshidome |
| 2014/0261522 | A1 | | 9/2014 | Smith |
| 2014/0290087 | A1 | | 10/2014 | Weatherly |
| 2015/0089828 | A1 | | 4/2015 | Moloney et al. |
| 2016/0166033 | A1 | | 6/2016 | Kerr et al. |
| 2016/0235178 | A1 | | 8/2016 | Atkinson et al. |
| 2016/0338466 | A1 | | 11/2016 | Atkinson et al. |
| 2016/0367003 | A1 | | 12/2016 | Stephens et al. |
| 2018/0255896 | A1 | * | 9/2018 | Chia ........................ A45D 2/00 |
| 2019/0116955 | A1 | | 4/2019 | Atkinson et al. |

FOREIGN PATENT DOCUMENTS

| | | | |
|---|---|---|---|
| CN | 202146022 | | 2/2012 |
| CN | 202407584 U | | 9/2012 |
| CN | 103393272 A | | 11/2013 |
| CN | 104244766 | | 12/2014 |
| CN | 204742992 | | 11/2015 |
| CN | 106165960 | | 11/2016 |
| CN | 106256287 | | 12/2016 |
| DE | 8715086 U1 | | 9/1988 |
| DE | 3906256 A1 | | 8/1990 |
| EP | 2086367 B1 | | 8/2010 |
| GB | 2399751 A | | 9/2004 |
| GB | 2487996 | | 8/2012 |
| GB | 2497192 A | | 6/2013 |
| GB | 2518641 | | 4/2015 |
| GB | 2538561 | | 11/2016 |
| GB | 2539437 | | 12/2016 |
| GB | 2560356 A * | 9/2018 | ............. A45D 20/12 |
| GB | 2567661 A * | 4/2019 | ......... B01D 45/0005 |
| JP | S58-83905 A | | 5/1983 |
| JP | 58-180105 | | 10/1983 |
| JP | S58-154706 U | | 10/1983 |
| JP | S58-180107 A | | 10/1983 |
| JP | 60-21205 | | 2/1985 |
| JP | 60-215305 | | 10/1985 |
| JP | S62-189005 U1 | | 12/1987 |
| JP | H1-75437 U1 | | 5/1989 |
| JP | H1-121502 U1 | | 8/1989 |
| JP | 2002-238649 | | 8/2002 |
| JP | 2009-191990 A | | 8/2009 |
| JP | 2010-187454 A | | 8/2010 |
| JP | 2014-139396 A | | 7/2014 |
| JP | 2018149286 A * | 9/2018 | ................ A45D 2/00 |
| JP | 2019076720 A * | 5/2019 | ......... B01D 46/0005 |
| WO | 2006/001657 | | 1/2006 |
| WO | WO-2006/001657 | | 1/2006 |
| WO | WO-2018162878 A1 * | 9/2018 | ............. A45D 20/12 |
| WO | WO-2019077301 A1 * | 4/2019 | ............. A45D 20/12 |

OTHER PUBLICATIONS

Notification of Reason for Rejection dated Mar. 25, 2019, directed to JP Application No. 2018-043084; 7 pages.

Patent Evaluation Opinions in the Patent Evaluation Report dated Feb. 22, 2019, directed to Chinese Application No. 2018203294532; 9 pages.

Search Report dated Jul. 25, 2017, directed to GB Application No. 1703764.9; 2 pages.

Atkinson et al., U.S. Office Action dated May 21, 2020, directed to U.S. Appl. No. 16/164,083; 21 pages.

Final Rejection dated Feb. 3, 2020, directed to JP Application No. 2018-043084; 6 pages.

* cited by examiner

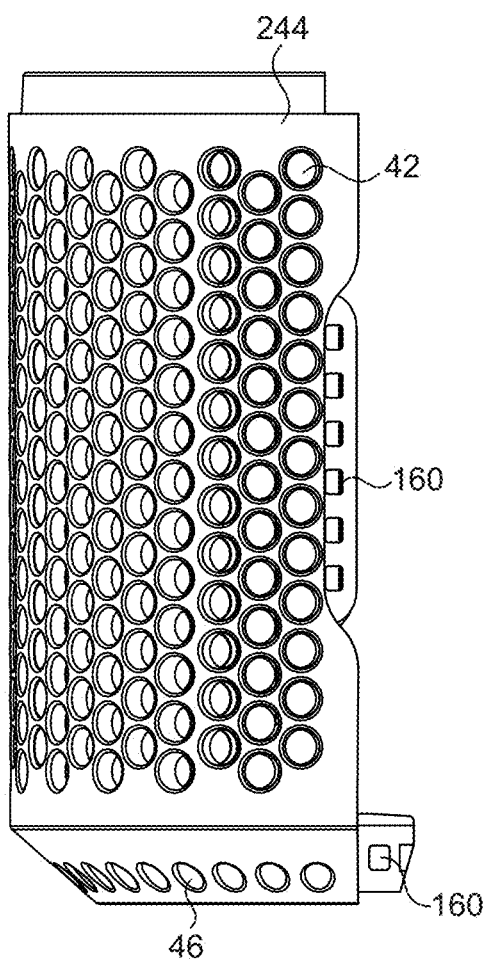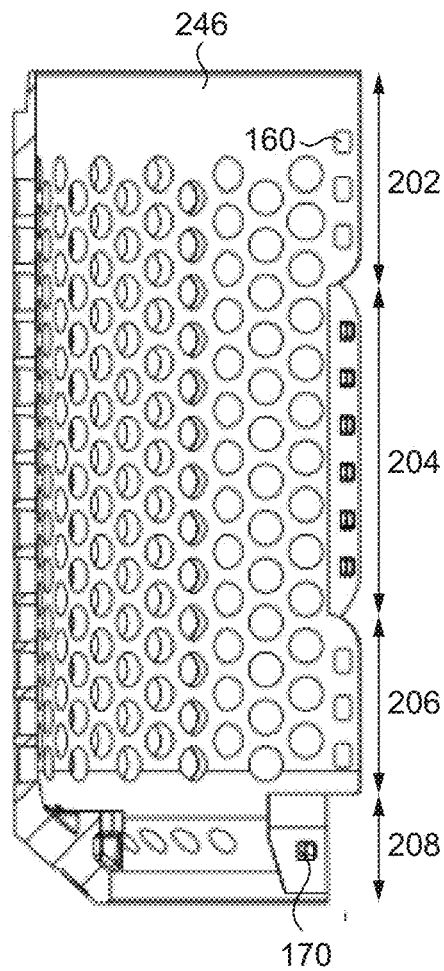
FIG. 8a    FIG. 8b
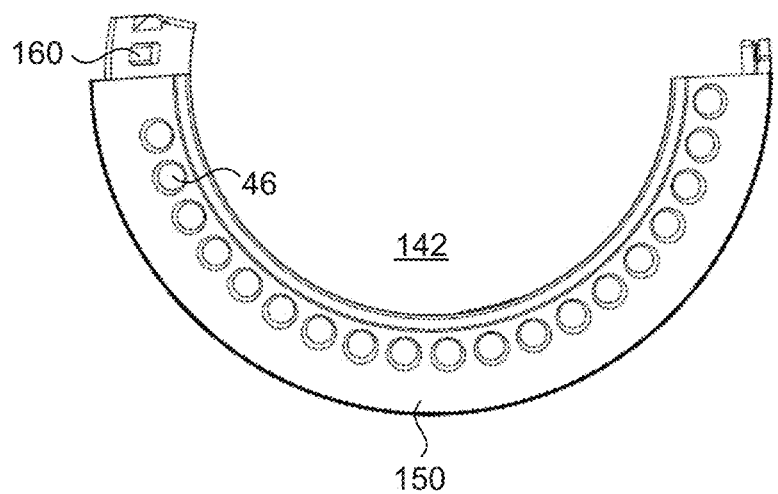
FIG. 9

HAND HELD APPLIANCE

REFERENCE TO RELATED APPLICATIONS

This application claims the priority of United Kingdom Application No. 1703764.9, filed Mar. 9, 2017, the entire contents of which are incorporated herein by reference.

FIELD OF THE INVENTION

This invention relates to a haircare appliance and in particular to a filter for a haircare appliance.

BACKGROUND OF THE INVENTION

In a conventional hot styling appliance, air is drawn into an inlet by a fan unit and directed towards the hair by an outlet. Often, one appliance is provided with different attachments, each having a different outlet and thus a different function, for example drying, curling or volumising. Depending on the style desired, the air may or may not be heated. The attachment may include bristles onto which hair is wrapped and held for styling. Conventionally a filter is provided to filter fluid that enters the appliance to remove dust and hair.

It is known to provide multi layered filtering systems for example with grille having relatively large apertures and an inner filter having relatively small apertures. Often the grille is removable to enable cleaning of the inner filter, or even replacement of one of the layers of the filter in the event of damage. The grille will often either screw onto a casing or snap fit onto a casing of the appliance.

SUMMARY OF THE INVENTION

According to some embodiments, a replacement grille is formed from at least two parts that fit together.

According to a first aspect, a haircare appliance includes a handle having a fluid inlet at one end and a power cable, wherein the fluid inlet is formed at least partially around the power cable and the fluid inlet comprises a filter grille, and wherein the filter grille is formed from two parts.

The two parts may be separate, individual pieces which are subsequently attached.

Preferably, the filter grille extends at least partially along the length of the handle.

In a preferred embodiment, the handle and the filter grille are cylindrical.

In a preferred embodiment, the two parts of the filter grille join together to produce an assembled grille.

Preferably, the assembled grille is removable from the handle of the appliance.

In a preferred embodiment, the assembled grille is retained around the power cable when the assembled grilled is removed from the handle of the appliance.

Preferably, the two parts of the filter grille are united via a lap joint.

In a preferred embodiment, the filter grille has a first end and a second end and the lap joint extends from the first end to the second end.

Preferably, the lap joint is interlaced. Thus, each of the two parts of the filter grille provide, sequentially an outer surface and an inner surface of the filter grille. The outer surface is a radially outer surface of the filter grille and it is the visible surface when the filter grille is attached to the appliance. The inner surface is a radially inner surface of the filter grille.

In a preferred embodiment, the two parts are joined in sections.

Preferably, the filter grille has an outer surface and the two parts comprise a first part and a second part.

In a preferred embodiment, the filter grille comprises a first section and in the first section, a first part comprises the outer surface.

Preferably, the filter grille comprises a second section and in the second section, a second part comprises the outer surface.

In a preferred embodiment, the filter grille comprises a third section and in the third section, a first part comprises the outer surface.

Preferably, the filter grille comprises a fourth section and in the fourth section, a first part comprises the outer surface. It is preferred that the fourth section extends across the end of the handle.

Preferably, the one of the first part and the second part which comprises the outer surface comprises a plurality of protrusions which extend radially inwards from the outer surface of the filter grille. Preferably, the other one of the first part and the second part which does not comprise the outer surface of the filter grille comprises a plurality of apertures adapted to receive the plurality of protrusions. This means that the outer surface of the filter grille, in the vicinity if the lap joint is smooth and that the interlocking of the protrusions and apertures is hidden when the two parts are assembled.

The first part and the second part may both comprise a region adjacent the lap joint in which the thickness of filter grille is reduced. The filter grille may have a nominal thickness t, and preferably, the reduced thickness in the region adjacent the lap joint plus the depth of a protrusion is approximately the same as the nominal thickness t.

In one preferred embodiment, the two parts are joined in three sections, and in a middle section one part comprises the outer surface and wherein in the adjacent sections a second part comprises the outer surface.

The lap joint generally extends parallel to the longitudinal axis X-X of the handle; this is visually aesthetic but also has the technical benefit that the attachment of the two parts around the cable is simplified. Each of the three sections are parallel to the longitudinal axis X-X however, the middle section is offset to the adjacent sections. Thus, at each intersection between adjacent sections, as the outer surface switches between parts, the lap joint curves from the middle section to the adjacent section.

Preferably, the filter grille extends at least partially across an end of the handle.

In a preferred embodiment, the two parts are joined across the end of the handle. Preferably, the part of the joint that extends across the end of the handle comprises a fourth part of the lap joint. Preferably, where the two parts are joined across the end of the handle, the respective protrusion and aperture that form the joint are radially spaced or offset from the other holes and protrusions.

According to a second aspect, there is provided a haircare appliance comprising a fluid inlet formed from a filter grille and an inner filter wherein the filter grille is formed from two separate parts.

Preferably, the two separate parts each comprise at least one aperture of the fluid inlet.

In a preferred embodiment, the filter grille is barrel shaped. The filter grille may be essentially tubular. Preferably, the appliance comprises a handle and the filter grille forms a continuation of an outer wall of the handle.

Preferably, two separate parts join together via a lap joint.

In a preferred embodiment, the separate parts join together via a pair of lap joints.

Preferably, the lap joint is interlaced.

In a preferred embodiment, the filter grille has an outer surface and along the lap joint each of the two parts provides a portion of the outer surface.

According to a third aspect, the invention provides a method of replacing a filter grille on a hair care appliance comprising:
(a) providing a filter grille in two parts;
(b) assembling the filter grille by connecting the two parts together; and
(c) attaching the filter grille to appliance.

Preferably, the appliance comprises a handle having an outer wall and, when attached to the appliance, the filter grille forms a continuation of the outer wall of the handle.

It is preferred that the appliance comprises a power cable and the filter grille is assembled around the power cable.

In a preferred embodiment, the appliance is a hair care appliance and preferably, a hairdryer or a hot styling device.

BRIEF DESCRIPTION OF THE DRAWINGS

The invention will now be described by way of example, and with reference to the accompanying drawings, of which:

FIGS. 8a and 8b show partial side views of each side of the first joint of the filter grille shown in FIG. 6; and FIG. 9 shows the end wall of the filter grille of FIG. 6.

DETAILED DESCRIPTION OF THE INVENTION

Figure 1:
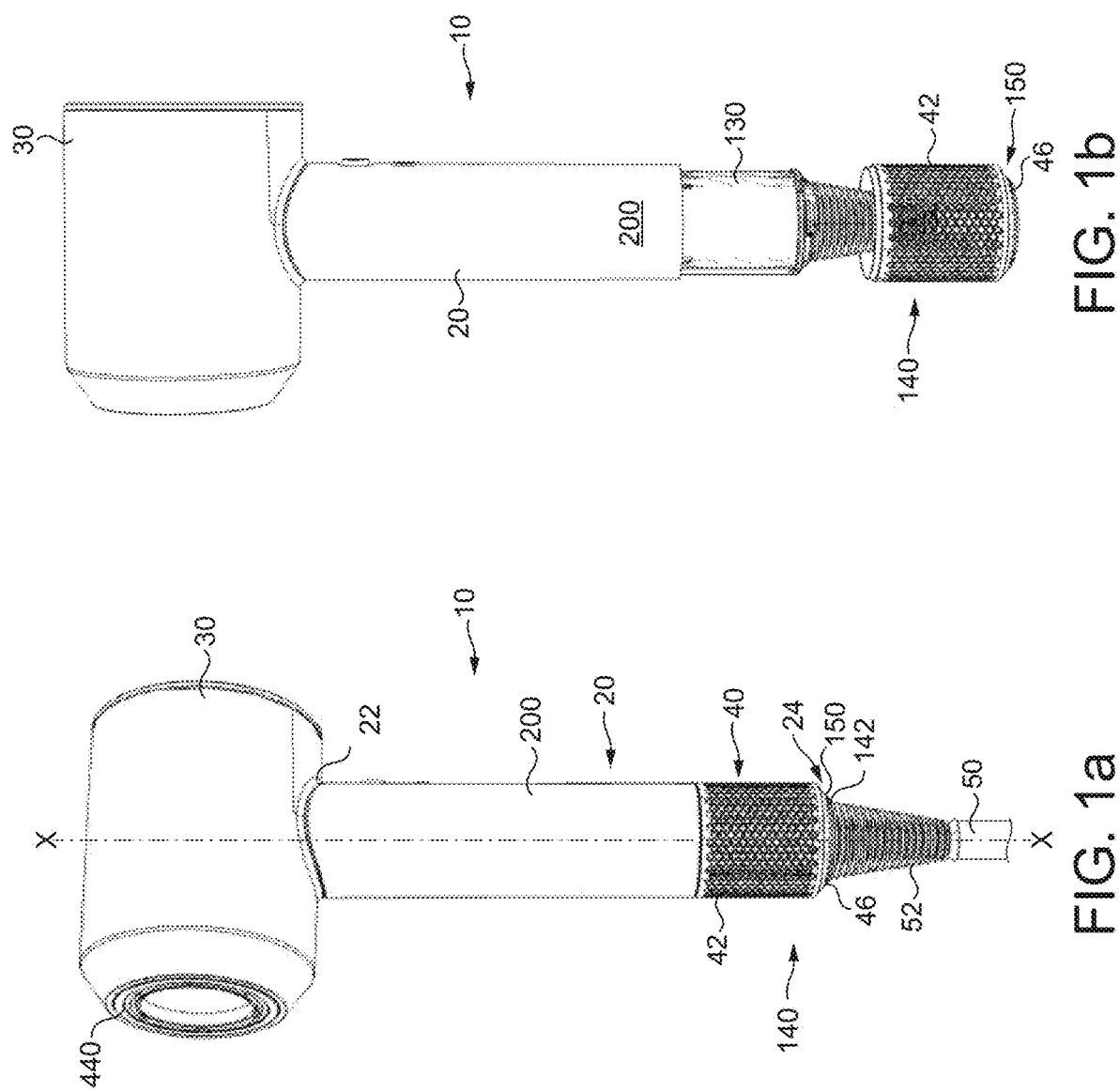
FIG. 1a shows an example of an appliance with a filter grille, according to an embodiment.
FIG. 1b shows the appliance of FIG. 1a with the filter grille removed.
Figure 2:
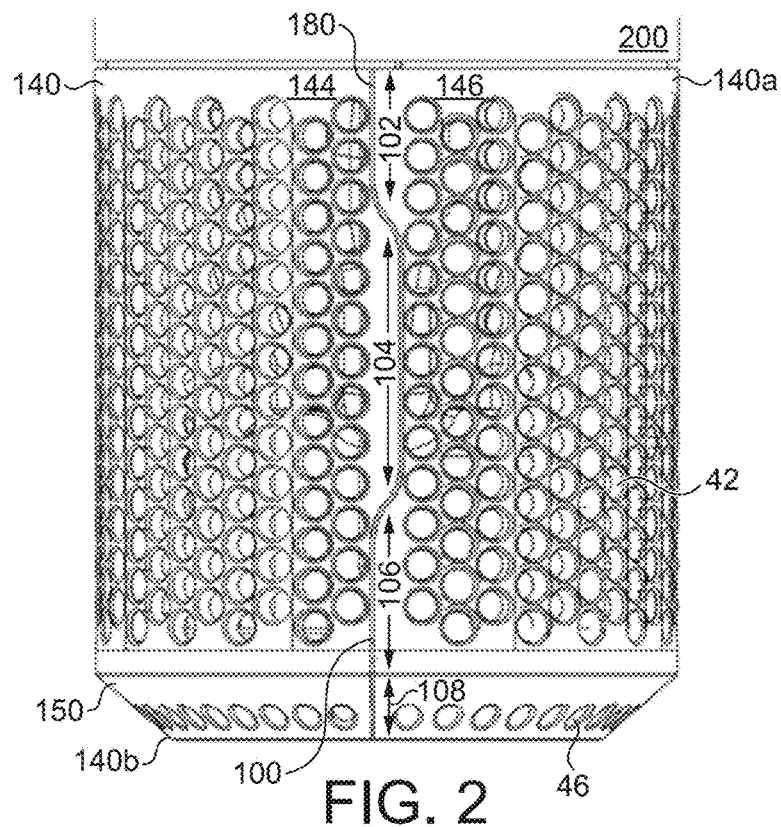
FIG. 2 shows a side view of a filter grille attached to the appliance, according to an embodiment.
Figure 3:
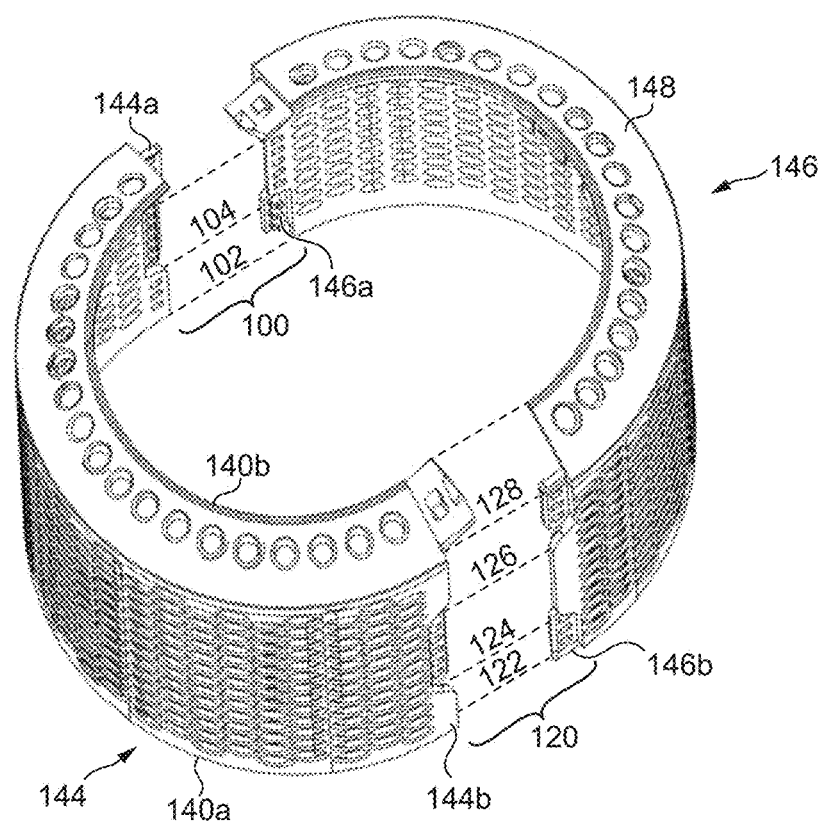
FIG. 3 shows an isometric view of two parts of a filter grille, according to an embodiment.
Figure 4A:
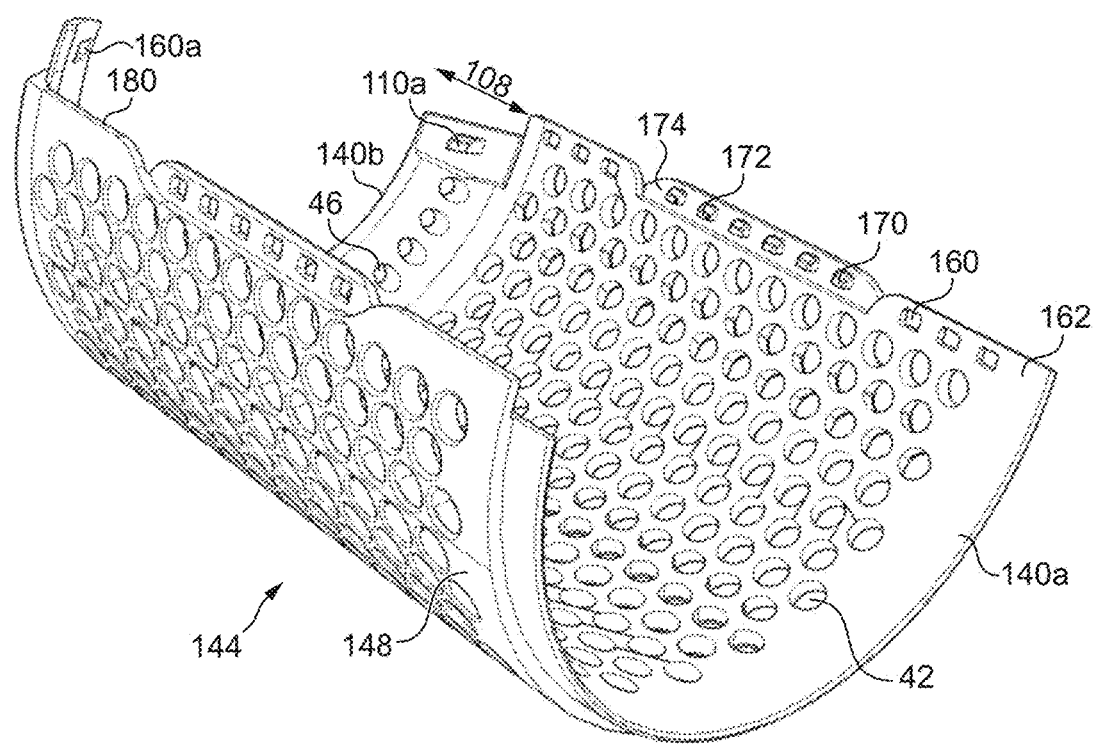
FIGS. 4a and 4b show isometric views of one part of a filter grille according to an embodiment.
Figure 4B:
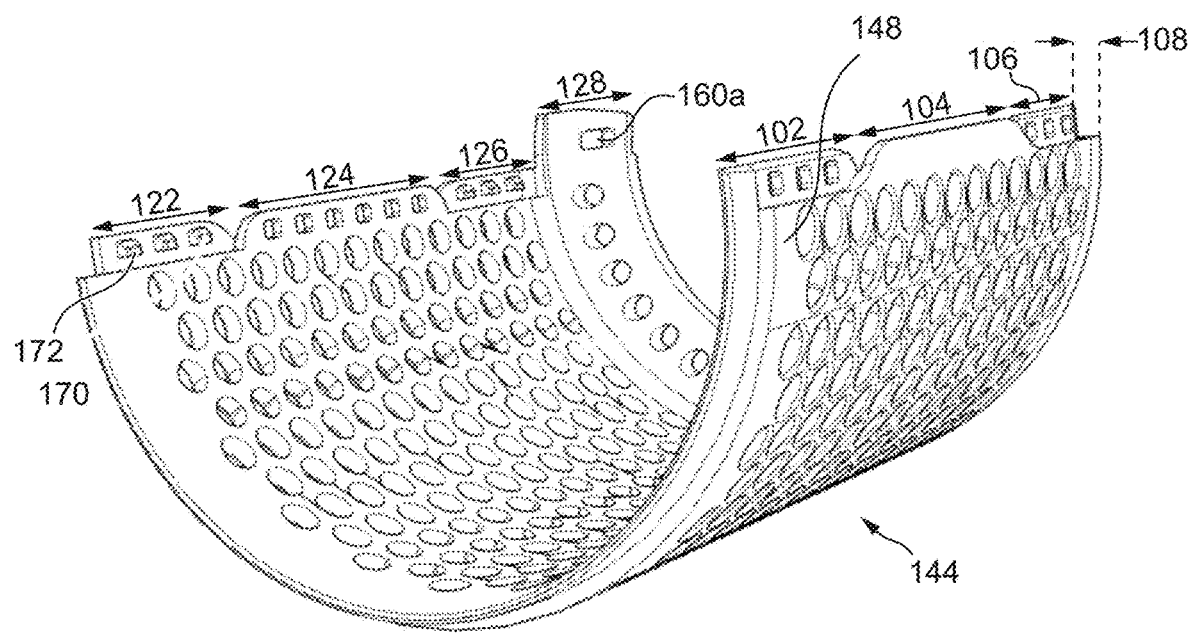
Figure 5B:
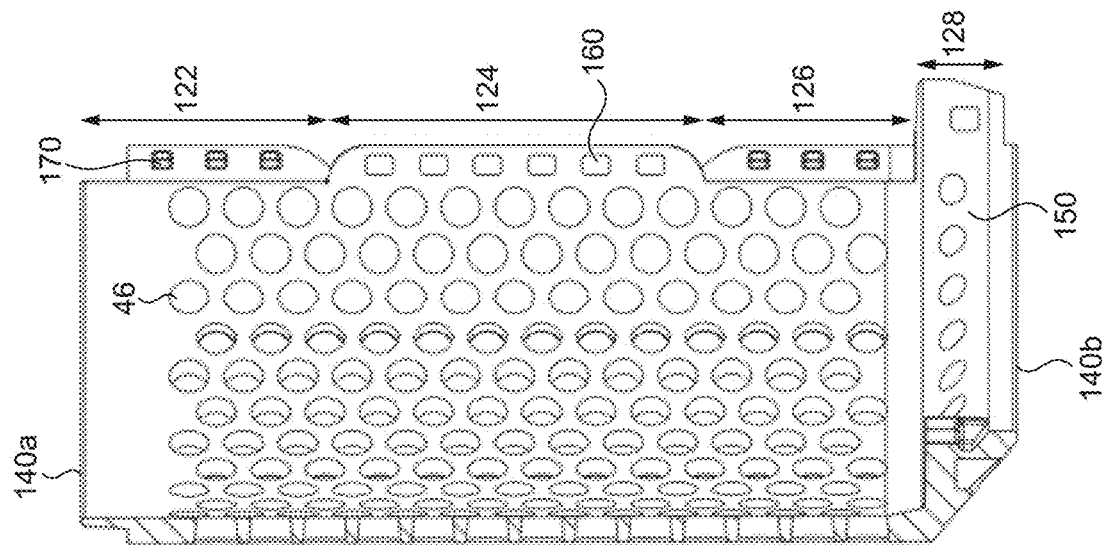
FIGS. 5a and 5b show partial side views of one part of the filter grille shown in FIG. 4b.
Figure 5A:
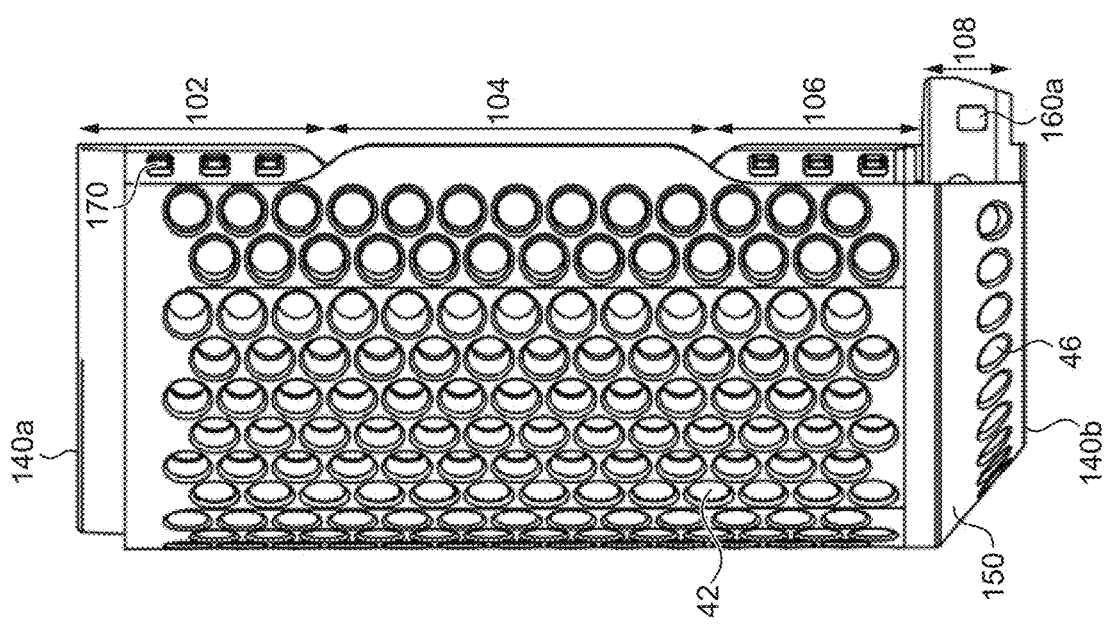
Figure 6:
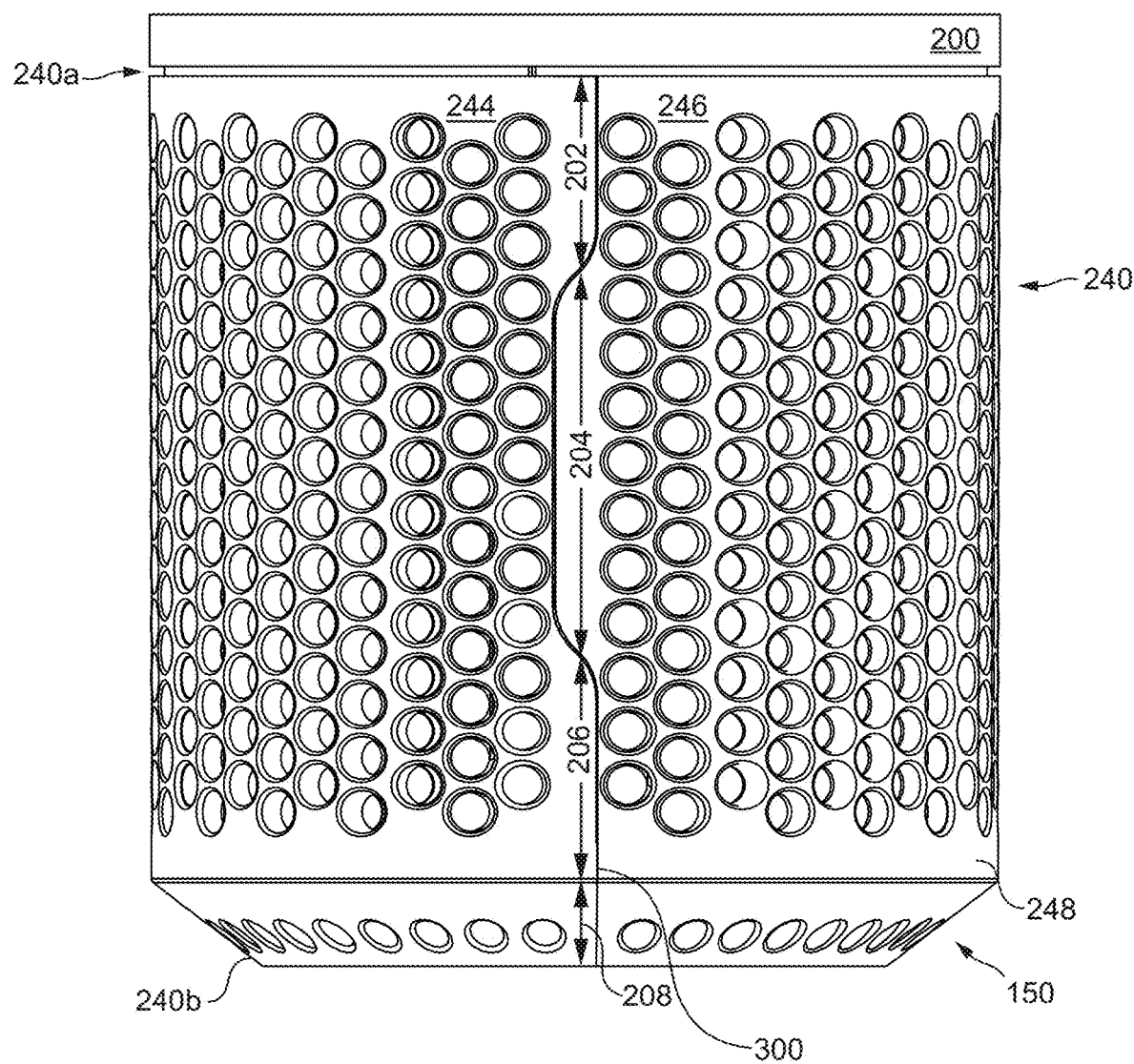
FIG. 6 shows a side view of an alternate filter grille, according to an embodiment, attached to an appliance.

FIG. 1a shows an example of a hand held appliance, in this case a hairdryer 10 with a handle 20 and a body 30. The handle 20 has a first end 22 which is connected to the body 30 and a second end 24 distal from the body 30 and which includes a primary fluid inlet 40. Power is supplied to the hairdryer 10 via a cable 50. At a distal end of the cable 50 from the hairdryer 10 a plug (not shown) is provided, the plug may provide electrical connection to mains power or to a battery pack for example.

The handle 20 has an outer wall 200 which extends from the body 30 towards a distal end 24 of the handle 20. The handle 20 has a longitudinal axis X-X along which the outer wall 200 extends from the body 30 towards the distal end 24. The primary fluid inlet 40 in the handle 20 has a two layers of filtration, a first layer is the filter grille 140 and the second layer is a finer filter mesh 130 which lies internal of the filter grille 140 (FIG. 1b).

The filter grille 140 includes first apertures 42 that extend around and along the filter grille 140 parallel to the longitudinal axis X-X of the handle 20 and in this embodiment, second apertures 46 that extend around an end wall 150 of the filter grille 140. The cable 50 is located approximately in the middle of the end wall 150 so extends from the centre of the handle 20.

It is preferred that the cable 50 extends centrally from the handle 20 as this means the hairdryer is balanced regardless of the orientation of the handle 20 in a users' hand. Also, if the user moves the position of their hand on the handle 20 there will be no tugging from the cable 50 as it does not change position with respect to the hand when the hand is moved. If the cable were offset and nearer one side of the handle then the weight distribution of the hairdryer would change with orientation which is distracting for the user.

Upstream of the primary fluid inlet 40, a fan unit (not shown) is provided. The fan unit includes a fan and a motor. In use the fan unit draws fluid in through a fluid inlet 40, along an internal fluid flow path, through a heater (not shown) which optionally heats the fluid which is then emitted by the fluid outlet 440 in the body 30.

The filter grille 140 is a removable article. When the filter grille 140 is removed it hangs on the cable 50 and enables the filter mesh 130 to be accessed for cleaning. If the filter grille 140 is damaged, the appliance will still function however it is preferred to replace the damaged filter grille with a new one. A problem exists as the filter grille 140 has an aperture 142 which is sized to fit with a strain relief 52 provided around the cable 50 adjacent the distal end 24 of the handle 20. The aperture 142 is smaller than the size of a plug (not shown) provided at the distal end of the cable 50 from the appliance 10. Thus, the replacement filter grille is provided in two parts 144, 146 which are attached around the cable 50. This negates the need for the plug (not shown) to be removed from the appliance in order to change the filter grille 140.

Referring to FIGS. 2 to 5b, in particular, the two parts 144, 146 of the filter grille 140 in this embodiment are joined along the length of the filter grille from a first end 140a which is adjacent to the outer wall 200 of the handle 20 to a second end 140b which includes the end wall 150. In order to reduce any stray fluid bypassing the apertures 42, 46 in the filter grille 140 the joint between the first part 144 and the second part 146 overlaps and is formed as a lap joint.

The lap joint is formed from a thinned region close to the edges 144a, 144b and 146a 146b respectively of each of the first part 144 and the second part 146. The lap joint has an underlay and an overlay where the overlay forms the outer surface of the grille. The underlay comprises a plurality of holes 160 and the overlay comprises a plurality of protrusions 170 adapted to be accommodated by the holes 160 in the other one of the two parts. Thus, when the two parts 144, 146 are joined the protrusions 170 engage within the holes 160. The protrusions 170 are asymmetrical in profile and have a first side 172 which is angled to assist in mutual deflection of a first thinned region 162 accommodating the holes 160 and a second thinned region 174 accommodating the protrusions 170 to allow the protrusions 170 to engage the holes 160.

In addition, the two parts 144, 146 of the filter grille 140 are joined in sections where for each adjacent section a different one of the two parts 144, 146 may comprise an outer surface 148 of the filter grille 140. One reason for having different sections is to make the joint stronger.

All of the holes are parallel to the longitudinal axis X-X of the handle 20 and all of the protrusions are parallel to the longitudinal axis X-X of the handle 20 and along the length of the lap joint, the part that comprises the outer surface changes, thus to allow alignment, a split line 180 of the lap joint has portions which are parallel and non-parallel to the longitudinal axis X-X of the handle 20.

The first part 144 and the second part 146 are identical thus, when each of the first part 144 and the second part 146 are arranged around the cable 50 the opposite sides of each part face one another enabling connection thereof.

A first joint 100 between the first part 144 and the second part 146 of the filter grille 140 will now be described. This first joint 100 starting from the first end 140a of the filter grille 140 which is adjacent the outer wall 200 of the handle 20 has a first section 102, a second section 104, a third section 106, and within the end wall 150, a fourth section 108. In the first section 102, the third section 106, and the fourth section 108, the second part 146 of the filter grille 140 comprises the outer surface 148 thereof. In the second section 104, the first part 144 of the filter grille 140 comprises the outer surface 148 thereof. In this embodiment, the first section 102, second section 104 and third section 106 are adjacent sections where a different one of the two parts 144, 146 comprises an outer surface 148 of the filter grille 140.

In this embodiment, for the fourth section 108, the respective hole 160a and protrusion 170a that form the connection of each of the two parts of the filter grille are offset from all the other holes and protrusions. If this pair of hole and protrusion were aligned, then the split line of the lap joint would have to curve over the junction between the end wall and the rest of the filter grille. In this embodiment the end wall is conical in shape so this would complicate the moulding, so instead the split line is continued parallel to the longitudinal axis X-X of the handle 20 and instead the protrusion and hole are radially spaced from the split line and the other holes and protrusions. Also, this results in the outer surface 148 of the filter grille 140 remaining on the second part 146 for the third and fourth adjacent sections.

Thus the lap joint is formed from interlaced sections and each of the first part 144 and the second part 144 sequentially form the overlap and underlap portions of the lap joint.

A second joint 120 between the first part 144 and the second part 146 of the filter grille 140 is formed in a similar manner, in this embodiment it is a mirror image of the first joint 100 however, that is not essential. This second joint 120 starting from the first end 140a of the filter grille 140 which is adjacent the outer wall 200 of the handle 20 has a first section 122, a second section 124, a third section 126 and within the end wall 150, a fourth section 128. In the first section 122, the third section 126 and the fourth section 108, the first part 144 of the filter grille 140 comprises the outer surface 148 thereof. In the second section 104, the first part 144 of the filter grille 140 comprises the outer surface 148 thereof.

In this embodiment, the sections which include the protrusions 170 form the outer surface 148 and this is preferred as it means that the outer surface 148 at each of the first joint 100 and the second joint 120 is smooth.

A second embodiment will now be described with respect to FIGS. 6 to 9. In this embodiment, components illustrated and already described in relation to FIGS. 1 to 5 have like reference numerals. In this embodiment, the lap joints are reversed compared to the first embodiment.

The two parts 244, 246 of the filter grille 240 are joined in sections where in each adjacent section a different one of the two parts 244, 246 may comprise an outer surface 248 of the filter grille 240. In this embodiment there are four sections but that is not essential. One reason for having sections is to make the joint stronger.

A first joint 300 between the first part 244 and the second part 246 of the filter grille 240 will now be described. The filter grille 240 has a first end 240a which is adjacent the outer wall 200 of the handle 20. Starting from the first end 240a of the filter grille 240, this first joint 300 has a first section 202, a second section 204, a third section 206 and within the end wall 150, a fourth section 208. In the first section 202, the third section 206 and the fourth section 208, the first part 244 of the filter grille 240 comprises the outer surface 248 thereof. In the second section 204, the second part 246 of the filter grille 240 comprises the outer surface 248 thereof.

Thus the lap joint is formed from interlaced sections and each of the first part 244 and the second part 246 sequentially form the overlap and underlap portions of the lap joint.

Figure 7:
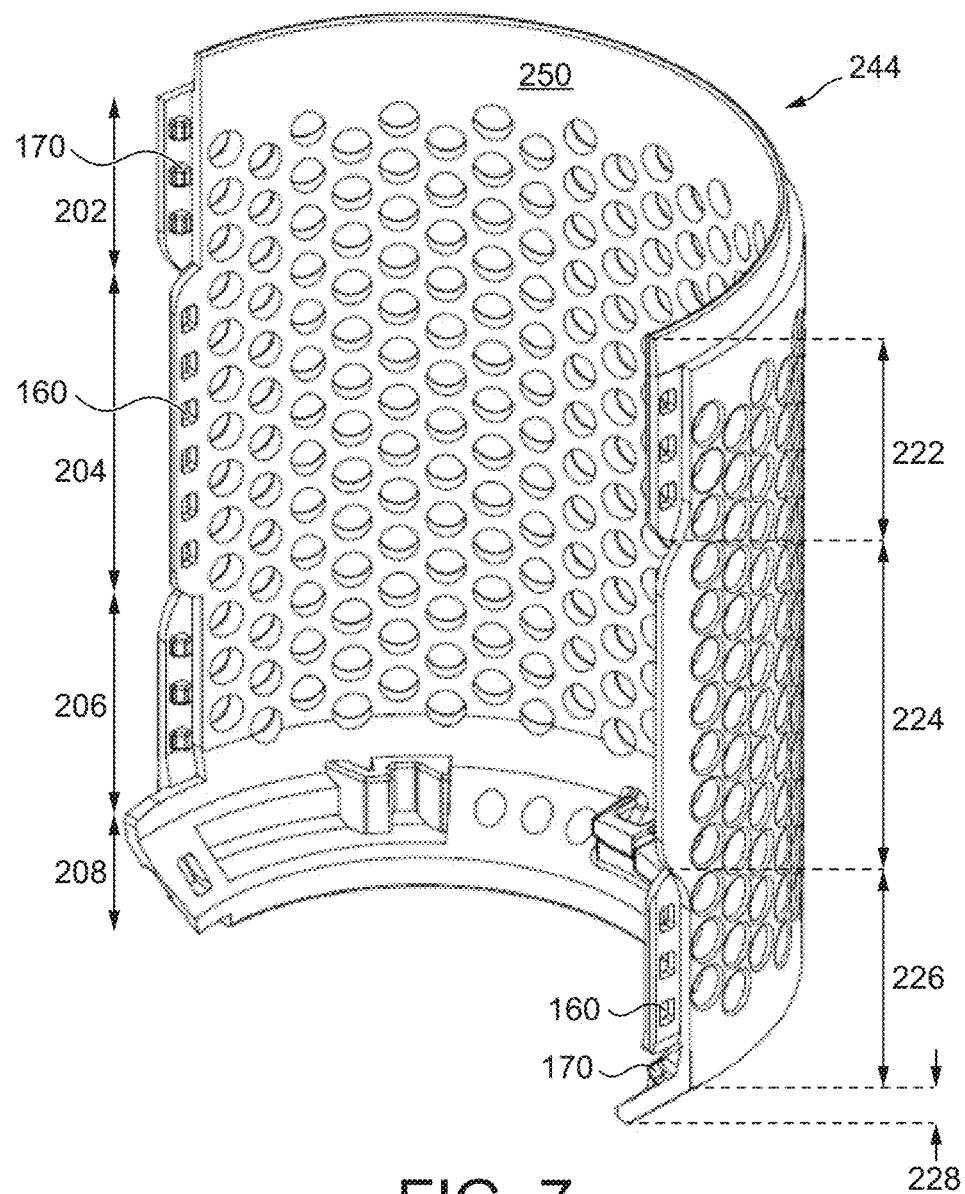
FIG. 7 shows an isometric view of one part of the alternate filter grille.

A second joint (not shown) between the first part 244 and the second part 246 of the filter grille 240 is formed in a similar manner, in this embodiment it is a mirror image of the first joint 300. One part of this second joint is shown in FIG. 7. Starting from the first end 240a of the filter grille 240, this second joint has a first section 222, a second section 224, a third section 226 and within the end wall 150, a fourth section 228. In the first section 222, the third section 226 and the fourth section 228, the first part 244 of the filter grille 240 comprises the outer surface 248 thereof. In the second section 204, the first part 244 of the filter grille 240 comprises the inner surface 250 thereof.

The invention has been described in detail with respect to a hairdryer however, it is applicable to any appliance that draws in a fluid and directs the outflow of that fluid from the appliance.

The appliance can be used with or without a heater; the action of the outflow of fluid at high velocity has a drying effect.

The fluid that flows through the appliance is generally air, but may be a different combination of gases or gas and can include additives to improve performance of the appliance or the impact the appliance has on an object the output is directed at for example, hair and the styling of that hair.

The invention is not limited to the detailed description given above. Variations will be apparent to the person skilled in the art.

The invention claimed is:

1. A haircare appliance comprising a handle for holding the haircare appliance during use, the handle comprising a fluid inlet at an end portion of the handle and a power cable extending from the end portion of the handle, wherein the fluid inlet is formed at least partially around the power cable, the fluid inlet comprises a filter grille located at the end portion of the handle, the filter grille is formed from two parts, and the two parts of the filter grille are united via a lap joint.

2. The appliance of claim 1, wherein the filter grille extends at least partially along a length of the handle.

3. The appliance of claim 1, wherein the handle and the filter grille are cylindrical.

4. The appliance of claim 1, wherein the two parts of the filter grille join together to produce an assembled grille.

5. The appliance of claim 4, wherein the assembled grille is removable from the handle of the appliance.

6. The appliance claim 5, wherein the assembled grille is retained around the power cable when the assembled grille is removed from the handle of the appliance.

7. The appliance of claim 1, wherein the filter grille has a first end and a second end and the lap joint extends from the first end to the second end.

8. The appliance of claim 1, wherein the lap joint is interlaced.

9. The appliance of claim 1, wherein the two parts are joined in sections.

10. The appliance of claim 9, wherein the filter grille has an outer surface and the two parts comprise a first part and a second part of the outer surface.

11. The appliance of claim 10, wherein the filter grille comprises a first section and in the first section, the first part comprises the outer surface.

12. The appliance of claim 11, wherein the filter grille comprises a second section and in the second section, the second part comprises the outer surface.

13. The appliance of claim 10, wherein the filter grille comprises a third section and in the third section, the first part comprises the outer surface.

14. The appliance of claim 10, wherein the filter grille comprises a fourth section and in the fourth section, the first part comprises the outer surface.

15. The appliance of claim 10, wherein the two parts are joined in three sections, and in a middle section the first part comprises the outer surface and wherein in the adjacent sections the second part comprises the outer surface.

16. The appliance of claim 1, wherein the filter grille extends at least partially across an end of the handle.

17. The appliance of claim 16, wherein the two parts are joined across the end of the handle.

18. A haircare appliance comprising a fluid inlet for fluid flow to enter the haircare appliance, the fluid inlet formed from a filter grille that extends around an inner filter, wherein the filter grille has a longitudinal axis that defines a length of the filter grille and the filter grille is formed from two separate parts that are joined so that the two separate parts each extend the length of the filter grille.

19. The appliance of claim 18, wherein the two separate parts each comprise at least one aperture of the fluid inlet.

20. The appliance of claim 18, wherein the filter grille is barrel shaped.

21. The appliance of claim 18, wherein the two separate parts join together via a lap joint.

22. The appliance of claim 21, wherein the two separate parts join together via a pair of lap joints.

23. The appliance of claim 22, wherein the lap joint is interlaced.

24. The appliance of claim 23, wherein the filter grille has an outer surface and, along the lap joint, each of the two separate parts provides a portion of the outer surface.

25. The appliance of claim 1, wherein the appliance is a hairdryer.

26. The appliance of claim 1, wherein the appliance is a hot styling device.

* * * * *